July 31, 1928. 1,678,969
P. ALTUNA
RESILIENT VEHICLE WHEEL
Original Filed Sept. 15, 1925  2 Sheets-Sheet 1
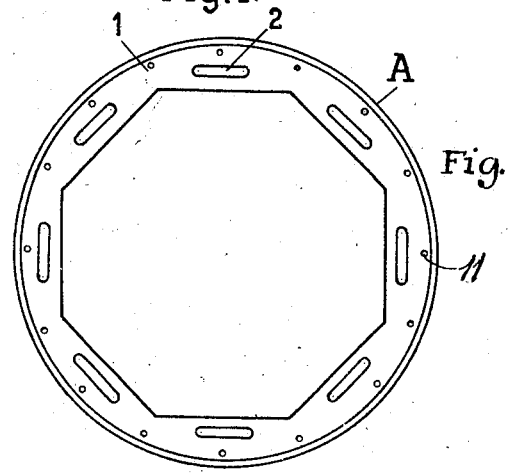
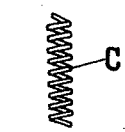
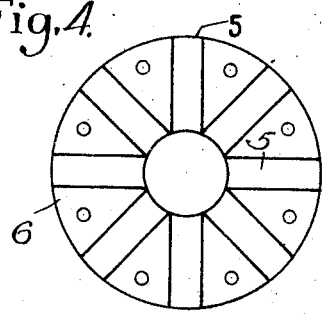
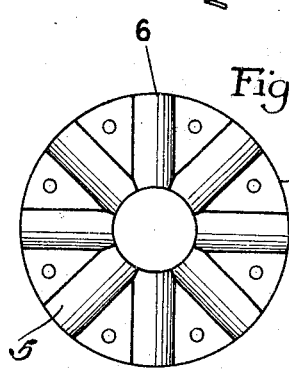
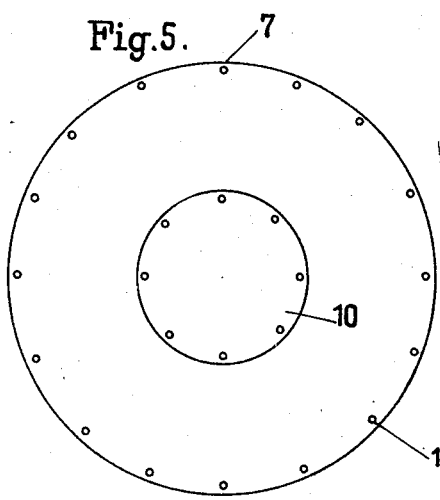
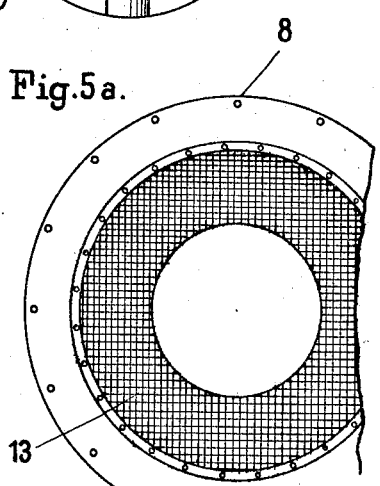
Inventor:
Pedro Altuna
by Attorney July 31, 1928.

P. ALTUNA 1,678,969

RESILIENT VEHICLE WHEEL

Original Filed Sept. 15, 1925    2 Sheets-Sheet 2

Inventor:
Pedro Altuna
by Paul P. Schilling
Attorney

Patented July 31, 1928.

1,678,969

UNITED STATES PATENT OFFICE.

PEDRO ALTUNA, OF SAN SEBASTIAN, SPAIN.

RESILIENT VEHICLE WHEEL.

Application filed September 15, 1925, Serial No. 56,464. Renewed June 5, 1928.

My invention relates to improvements in vehicle wheels especially those having solid tyres. They have for object a construction, whereby such wheels are rendered resilient, so as to obtain advantages similar to those of a pneumatic tyre, while obviating their disadvantages resulting from punctures, ruptures or the like.

According to the invention, the resiliency in a wheel is obtained by the interposition of resilient and flexible means between the spoke members and the hub.

Broadly the invention consists in the arrangement of radially resilient spokes, composed of coiled compression springs and telescoping tubular housings therefor, one member of which housings is flexibly connected to the wheel rim, while the other is rigidly mounted on and in radial relation to the hub of the wheel.

The accompanying drawings illustrate by way of example a construction of a resilient wheel embodying the invention.

Figure 1 is a side elevation of the wheel felloe or rim.

Figures 2 and 2ª are side and edge views of one of the tubular spoke members.

Figure 3 is a view of one of the coiled compression springs.

Figures 4 and 4ª are opposite side views of one of the spoke holding plates or disks.

Figures 5 and 5ª are similar views of the outer cover plate.

Figure 6:
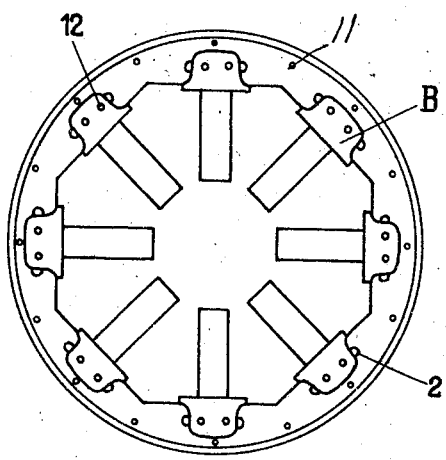
Figure 6 is a view of the rim and the tubular spoke members fastened thereto.
Figure 7:
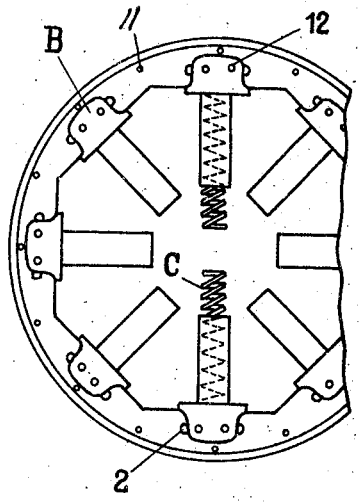
Figure 7 is a view similar to Figure 6 showing two of the compression springs fitted in position in their tubular spoke members.
Figure 8:
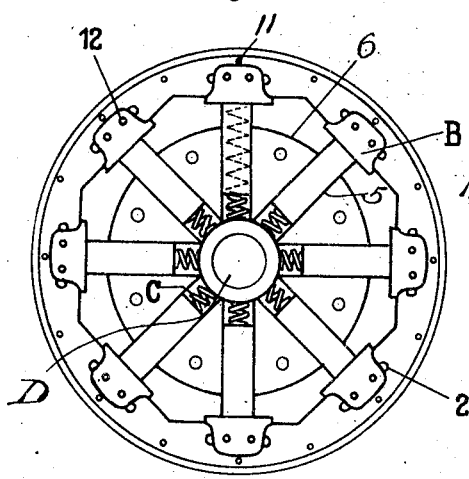
Figure 8 is an outer side view of the wheel with a cover plate and a spoke holding plate removed.
Figure 9:
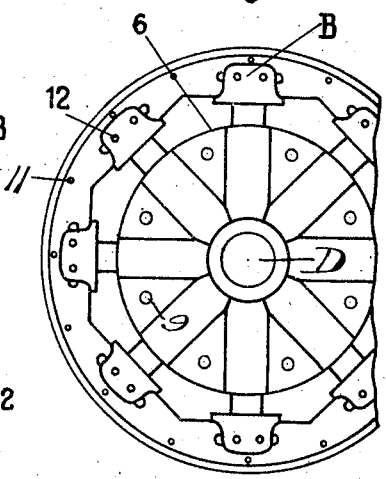
Figure 9 is a view similar to Figure 8, but showing in addition the spoke holding plate omitted from the latter figure.
Figure 10:
Figure 10 is a view of one of the sliding blocks.

The wheel rim A is provided centrally of its width with a flange or felloe 1 as shown in Fig. 1. The inner edge of this flange forms an equilateral octagon for a wheel with eight spokes as illustrated in the drawings, or any other equilateral polygon according to the number of spokes. The flange 1 has formed in it, parallel with each of the sides of the polygon and at right angles to the centre line of each spoke, a slot 2 to receive and guide a sliding block 3 (Fig. 10) to which the forked head 4 of a tubular spoke member B Fig. 2 is attached by means of pins or bolts 12 as shown in Figs. 6 to 10. The spokes are constituted by tubular spoke members B and coiled compression springs C (Figs. 3, 7 and 8) which are housed in the tubular members B and bear with their inner free ends on the hub D of the wheel, Fig. 8. The tubular members B are of such a length that their inner free ends are spaced from the hub D and they are adapted to telescope in cylinders formed radially in relation to the hub D by semi-cylindrical grooves 5 formed in a pair of spokes holding plates or disks 6 (of which one is shown in Figs. 4 and 4ª in opposite side elevations), fitted face to face on the hub from opposite sides of the wheel and secured together by bolts 9 Figs. 8 and 9.

A sheet metal outer shield or cover plate 7, Fig. 5 is hermetically secured by screws or bolts 11 to the rim A. Preferably this shield 7 is provided concentrically with an inspection door 10 which is hermetically bolted to the shield 7. On its inside the wheel has hermetically fitted to its rim A a shield composed of an outer annular sheet metal plate 8 Fig. 5ª while the inner part 13 of this shield is made of waterproof fabric or other suitable flexible material, which hermetically fits the hub D or the axle of the wheel. These shields 7 and 8, 13 not only protect the mechanism enclosed therein from dust, rain, etc. but also constitute a well for a lubricant so that all the mechanisms work in an oil bath.

The construction according to the invention enables the forked heads 4 of the spoke members B, guided by the slides 3 in the slots 2 to slide on flange 1, when the spokes in rotating are gradually compressed and expanding under the conditions of the road or the load without thereby exercising undue strains upon the telescoping parts B and 6.

Having thus described my invention, what I claim is:

1. A vehicle wheel embodying a rim, a flange upon the interior of the rim having angularly related edge portions and provided with a slot parallel with each edge portion, and resilient spokes equal in number to said angularly related edge portions of the flange, said spokes having forked ends straddling the flange and slidably engaging the slots and angularly related edge portions.

2. A vehicle wheel embodying a rim, a flange upon the interior of the rim having angularly related edge portions and provided with a slot parallel with each edge portion, blocks slidably mounted in said slots, and resilient spokes equal in number to the angularly related edge portions, said spokes having forked ends straddling the flange and slidably engaging the angularly related edge portions and secured to said blocks.

In testimony whereof he affixes his signature.

PEDRO ALTUNA.